Sept. 13, 1949.    H. L. ZIVI    2,481,966
OPERATING HANDLE FOR PEDAL CONTROL
Filed Jan. 31, 1947

INVENTOR.
Harold L. Zivi.
BY B. Gordon Allen
Atty.

Patented Sept. 13, 1949

2,481,966

UNITED STATES PATENT OFFICE 2,481,966

OPERATING HANDLE FOR PEDAL CONTROL

Harold L. Zivi, Evanston, Ill.

Application January 31, 1947, Serial No. 725,666

2 Claims. (Cl. 74—481)

This invention relates to an operating handle for pedal control and particularly an operating handle whereby a handicapped person may manually control any desired pedal of an automobile.

The extensive use of land mines in the recent war has resulted in an enormous number of leg amputee cases. One of the unfortunate consequences in single leg amputations is that such persons cannot safely and conveniently operate a standard make automobile.

To provide automotive transportation for such handicapped persons various expedients have been tried, the most common of which is the special attachment automobile built by the manufacturer. The special automobile, however, is not a complete solution of the problem. Not only is such an automobile expensive and difficult to obtain, but in those cases where one automobile is required for use by an entire family, the non-handicapped members of the family find the departure from standard drive makes driving awkward and difficult. Furthermore, the same problem confronts the handicapped person when circumstances make it necessary for him to drive other automobiles.

It is an object of the present invention to provide an operating handle for pedal control whereby a single legged person may easily and conveniently operate any standard drive automobile.

It is a further object of this invention to provide an operating handle for manual pedal control of automobile which may be used on any desired pedal with equal facility.

It is another object of this invention to provide an operating handle for manual pedal control of automobiles which is simple and inexpensive, which may easily be carried on the person and readily adjusted to fit any pedal.

Numerous other objects and advantages will be apparent throughout the progress of the following specifications.

The accompanying drawing illustrates a selected embodiment of the invention and the views therein are as follows.

The operating handle for manual pedal control of automobiles shown herein for the purpose of illustrating the present invention comprises a body member 10 which may be of wood plastic or any desired material having side faces 11, bottom face 13 and upper face 15.

Figure 4:
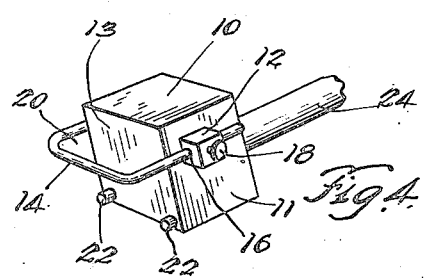
Fig. 4 is a perspective fragmentary view showing the operating end.

Permanently secured to the upper portion of said side faces 11 are strap receiving members 12 having openings 16 and set screws 18. A strap 14 is threaded through said openings 16 of receiving members 12 to form loop 20 around the upper portion of bottom face 13 and is kept in position by set screws 18 as shown in Fig. 4. The loop may be adjusted to any desired size by a simple manipulation of the strap and the set screws. The strap 14 can be constructed of any suitable material although it has been found that flexible steel gives good results and while it is illustrated as being round in form, may be flat, rectangular or square as desired.

Fastened to the lower portion of bottom face 13 of body member 10 are twin studs 22, preferably of rigid construction and which may be faced with frictional material such as rubber. It is preferred that said studs 22 extend to a distance slightly less than the extent of loop 20, although such distance is not deemed critical and may be lengthened or shortened to suit the individual user.

Figure 2:
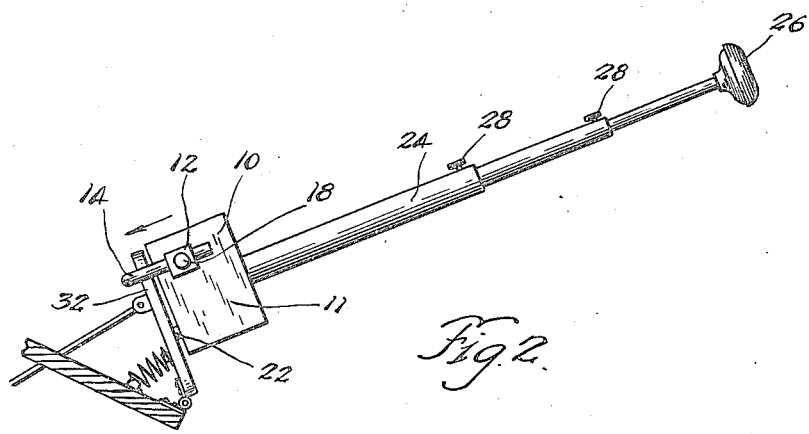
Fig. 2 is a side elevational view showing the improved handle in operating position.
Figure 3:
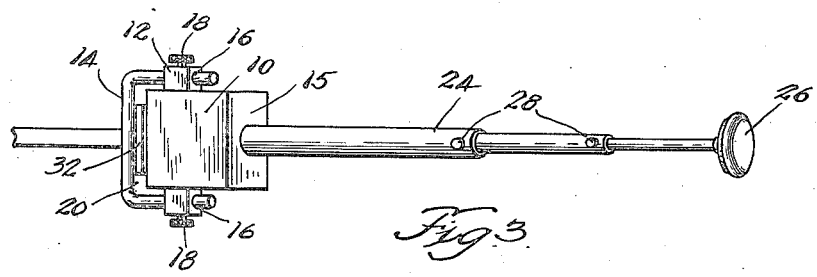
Fig. 3 is a top plan view.

Extending from body member 10 and at an angle thereto is the elongated member 24, having at the upper end thereof, a knob 26. Said elongated member may be a solid rod, although it is preferred to be a hollow cylinder of the telescoping type as illustrated in Figs. 2 and 3. When of the telescoping type it may be lengthened or shortened by adjustment of the set screws 28.

Figure 5:
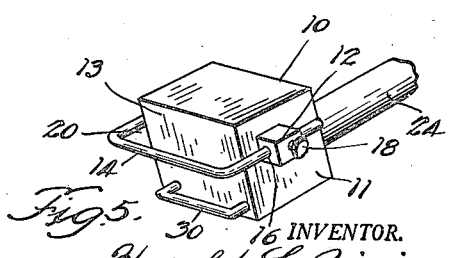
Fig. 5 is a perspective view of a modified form of operating end.

Illustrated in Fig. 5 is a modified form of body member wherein the bar 30 is used in place and stead of twin studs 22 for purposes hereinafter set forth.

Figure 1:
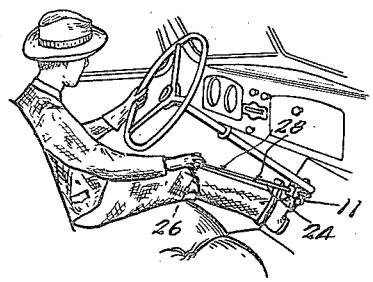
Fig. 1 is a perspective view showing the operating handle in use on the accelerator pedal of an automobile.

The device is used as illustrated in Fig. 2. As there shown, the accelerator pedal 32 is inserted in loop 20 formed by strap 14, the twin studs 22 or the bar 30 resting on the lower position of said pedal to hold the body member 10 firmly in position. The elongated member 24 extending from said body member and at an angle thereto and adjusted by set screws 28, will bring the knob 26 within comfortable reach of the user. The pedal 32 may then easily be depressed or released by hand. While an accelerator pedal is illustrated and Fig. 1 shows the right leg missing, in the case of a lost left leg the device may be used on the clutch or brake pedal with equal beneficial results.

When not used the loop 20 is simply slid over the end of the pedal and the device is carried away on the person. It leaves a standard drive automobile to be used by a non-handicapped person and it provides the handicapped one with means to drive any standard automobile.

Changes may be made in form and construction without departing from the spirit of the invention or sacrificing any of its advantages and the right is hereby reserved to make all changes as fairly fall within the scope of the following claims.

What is claimed as new and desired to be secured by Letters Patent of the United States is as follows:

1. A device of the class described comprising a body member, a strap secured to the upper portion of said body member, said strap being adjustable to engage over pedals varying in size, means permanently secured to the lower portion of said body member, said means being faced with frictional material to prevent lateral displacement of said body member and an elongated member secured to and extending from said body member and at an angle thereto said elongated member being adjustable to any desired length.

2. A device of the class described comprising a body member, a strap secured to the outer face of the upper portion of said body member to engage the operating pedal of an automobile, said strap being adjustable to engage over pedals varying in size, means permanently secured to the lower portion of the outer face of said body member to prevent lateral displacement of said body member when said body member is engaged, and an elongated member secured to and extending from said body member and at an angle thereto to permit operation of the said pedal by hand.

HAROLD L. ZIVI.

REFERENCES CITED

The following references are of record in the file of this patent:

UNITED STATES PATENTS

| Number | Name | Date |
|---|---|---|
| 1,342,372 | Carmondy | June 1, 1920 |
| 1,545,555 | Gagelman | July 14, 1925 |
| 1,593,338 | Kipp | July 20, 1926 |